Jan. 15, 1952  W. H. MOORE  2,582,646
FISH LURE
Filed April 4, 1947
FIG. 1.
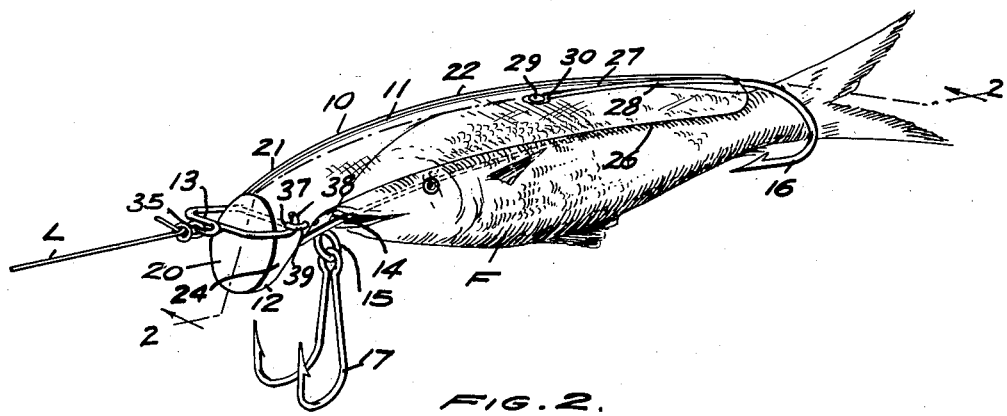
FIG. 2.
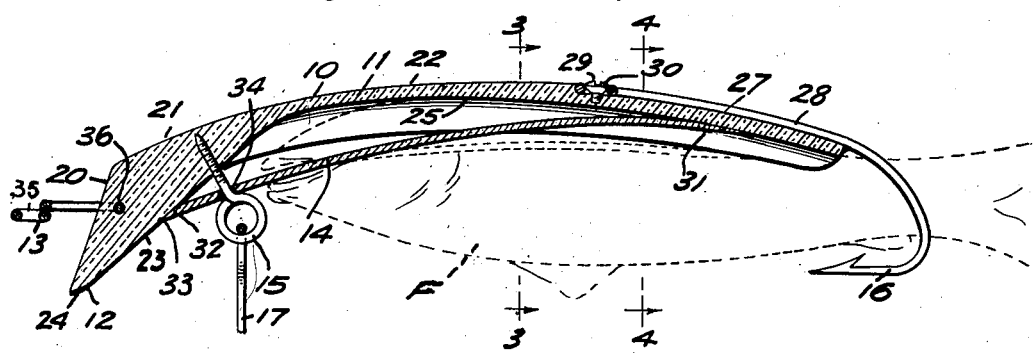
FIG. 3.
FIG. 4.
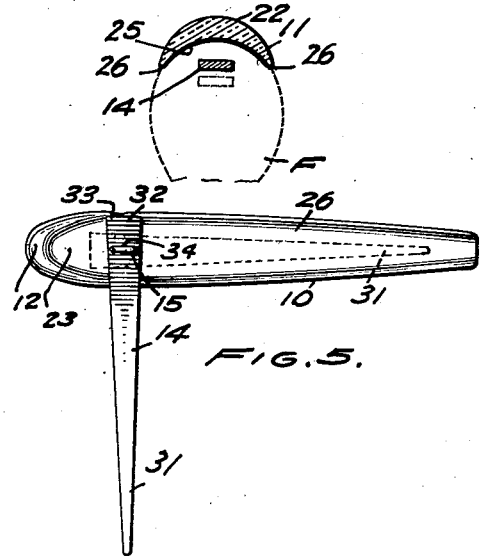
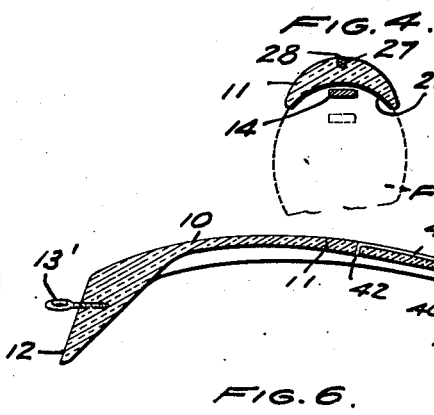
FIG. 5.
FIG. 6.
INVENTOR
WARREN H. MOORE
ATTORNEY Patented Jan. 15, 1952

2,582,646

UNITED STATES PATENT OFFICE 2,582,646

FISH LURE

Warren H. Moore, Bennington, Vt.

Application April 4, 1947, Serial No. 739,313

7 Claims. (Cl. 43—44.2)

This invention relates to fish lures and more particularly to that type of lure which is adapted to receive and retain, but visibly exposed, a small bait fish.

It is an object of this invention to provide a fish lure that has an extremely natural appearance, particularly when under water, and one which has a realistic, natural swimming motion when moved through the water as when employed in casting or trolling. It is a further object of the invention to provide a fish lure that is adapted to the combined use of natural and artificial baits. It is still another object of the invention to provide an article of this type that embodies economy of construction, simplicity of design and certainty of operation or function.

The foregoing objects and others ancillary thereto are preferably accomplished, in accordance with a preferred embodiment of the invention, by a plug member that is so arranged as to function as an artificial bait and is also adapted to receive and hold a natural bait, and is designed to impart to the lure a natural appearance and a natural swimming motion when employed in casting or trolling. The plug member comprises an elongated body in the form of a curved shell, whose top is convex and whose underside is concave, and has a nose portion extending downwardly at the front end of the body and which terminates, forwardly, in an inclined planar surface. A flat pin is seated behind the inclined nose portion and extends longitudinally beneath the plug body, and this pin is secured to the nose portion by a screw which passes through an aperture in the pin adjacent its forward end and which is threaded into the rear portion of the nose piece. By the above described arrangement, a bait fish may be impaled on the pin, and the pin may be so tensioned by its retaining screw that the back of the fish will be firmly nested with the concave underside of the body.

The body is of such a width as to cover only the central portion, transversely, of the back of the fish, leaving the major portion of the bait fish exposed to view regardless of the angle at which it is observed. The longitudinal central portion of the body is sufficiently thick to accommodate a groove for the reception of the stem or shank of a rearwardly positioned fish hook or a lead for receiving a fish hook, or to permit the imbedding of these elements in the event that the body is molded. In addition, the pin securing screw may be of the eye type and have a fish hook secured thereto. The body and nose portion may be painted or colored as an imitation of the bait fish, but, preferably, however, it is formed of a transparent material through which the bait fish is clearly visible. Thus the plug suports the bait fish in a natural position and without obstructing the view of the bait fish, and the nose protects the bait fish to prevent its being torn or swept from the plug while the front surface of the nose causes the lure to imitate the motion of a swimming fish when the lure is drawn through the water.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout and in which:

Fig. 1 is a view in perspective of the preferred embodiment of a fish lure in accordance with the present invention and including a bait fish assembled therewith;

Fig. 2 is a longitudinal sectional view taken longitudinally through the fish lure on a plane corresponding to line 2—2 of Fig. 1;

Fig. 3 is a cross sectional view taken transversely through the lure on a plane corresponding to line 3—3 of Fig. 2;

Fig. 4 is a cross sectional view taken transversely through the lure on a plane corresponding to line 4—4 of Fig. 2;

Fig. 5 is a bottom plan view of the lure with the bait fish receiving pin pivoted laterally to facilitate the impaling of a bait fish thereon; and Fig. 6 is a cross-sectional view taken on a vertical plane extending longitudinally through a lure embodying modifications of the invention.

With reference to the drawing, specifically to Fig. 1, the preferred embodiment of the invention comprises a plug 10 having a body portion 11 and a nose portion 12, an eye 13 secured to the nose portion 12 for connection with a swivel or leader L, a bait impaling pin 14 extending longitudinally beneath the plug 10 and adapted to have a bait fish F impaled thereon, a fastener 15 for securing the pin 14 to the plug 10, a rearwardly positioned fish hook 16 and, if desired, a forwardly positioned fish hook 17. The plug 10 may be fashioned of metal, wood or any other suitable material, however, preferably it is molded of a plastic material. While the plug may be formed of an opaque material that may be colored or camouflaged to represent a portion of the bait fish, or of a translucent or frosted material, it is preferred that it be formed of a clear transparent material which, when properly fashioned, becomes substantially invisible when in water.

The specific design of the plug 10 is best shown in Fig. 2 wherein it will be seen that the nose portion 12 is downwardly and forwardly inclined from the front of the body portion 11 and is generally triangular in longitudinal cross section. The nose 12 has a flat front face 20 which is inclined at an angle of 15° to 20° from the vertical when the plug 10 is in its normal, generally horizontal, floating or swimming position. The top surface 21 of the nose 12 is inclined upward from the horizontal and is formed by a continuation of the curved top surface 22 of the body portion 11. The angle of the front surface of the nose portion 12 is such that when the plug 10 is pulled through the water, by means of the eye 13, the plug 10 will be caused to wobble or wiggle in a manner that realistically simulates a swimming bait fish.

In other words, as the plug 10 is pulled through the water the flat angular resistance of the front face 20 will cause the plug 10 to wobble sideways and to dart up and down vertically in the water much as a bait fish of the same general size would do when swimming through the water. The up and down movement of the plug 10 is modified by the streamline inclined top surface 21 which eliminates eddy currents over the top of the nose 12 so that the up and down movement of the plug 10 is more or less smoothed out and not too erratic. The rear surface 23 of the nose 12 is inclined at an angle of from 30° to 45°, whereas the circumferential edge 24 is formed as a continuation of the transverse curvature of the top surface 21 and is generally oval in shape to approximate the cross section of the body of a bait fish.

The body portion 11 is formed as a continuation of the top rear edge of the nose portion 12 and its upper surface 22 is convex both longitudinally and transversely whereas its under surface 25 is concave in both directions. Specifically, the body portion is in the form of an inverted trough that is curved very slightly longitudinally and has a transverse cross section which is in the general shape of a crescent. The concave under surface 25 is curved both longitudinally and transversely so as to approximate the general shape of the back of a bait fish that is to be nested thereagainst. That is, the longitudinal curvature of the under surface 25 approximates the longitudinal curvature of the back of a fish extending from its head rearwardly toward its tail, and the transverse concave curvature of the underside 25 has a much smaller radius so as to approximate the shape of the back of the fish transversely of its body.

The longitudinal curvatures of the upper and lower surfaces 22 and 25 of the body portion 11 are best shown in Fig. 2 whereas the transverse curvatures of these surfaces are best shown in Figs. 3 and 4. The upper surface 22 of the body portion 11 extends more or less concentric with the under surface 25 in a longitudinal direction but has a smaller radius in a transverse direction so that it intersects the curvature of the undersurface 25 and produces a transverse cross section that is crescent shaped. The upper and lower surfaces 22 and 25 respectively are arranged to meet or intersect and form lateral edges 26 which are thin, and therefore substantially invisible, but which rapidly thicken to provide the necessary strength.

As best shown in Figs. 3 and 4, the distance between the lateral edges 26 should be such as to only partially span the width of the bait fish for which the plug is adapted. That is, the body portion 11 should not completely cover the upper side of the bait fish but should be of a width sufficient to have the back of the bait fish firmly nested within the underside 25 while, nevertheless, leaving at least three-quarters of the bait fish exposed to view regardless of the angle at which it is scanned. It will be understood that the plug 10 may be made in a variety of sizes for use with different types and sizes of bait fish so that the preferred proportions may be maintained.

The crescent shape of the transverse cross section of the body is preferred for three reasons. In the first place, it permits the joining of the top surface 22 with the under surface 25 at the edges 26, as described above, in such a manner that these edges are substantially invisible when the plug 10 is under water. Secondly, this shape provides sufficient material along the longitudinal center of the body portion to permit the formation of a groove 27 therein for the reception of the shaft or shank 28 of the rearwardly positioned fish hook 16 and to permit the embedding of a fastening screw 29 through the eye 30 of the hook 16, as shown in Fig. 2. Thirdly, this crescent shape provides sufficient strength and rigidity to the plug 10 to permit it to function in the desired manner and to withstand the forces exerted thereon when a fish is hooked while retaining a streamlined outline that resembles that of a fish.

The bait impaling pin 14, best shown in Figs. 2 and 5, is preferably composed of a flat strip of stainless steel or the like which has a certain amount of resiliency so that it may be tensioned to hold the fish F nested against the body 11. The pin 14 has its rearwardly disposed end 31 formed in a point in order to facilitate the impaling of a bait fish thereon, whereas the forwardly disposed end 32 is preferably squared off to provide a flat front edge 33 which normally abuts against the rear portion of the nose. The pin 14 has an aperture 34 adjacent its forward end 32 to freely receive a fastener 15, which is preferably in the form of an eye screw, that is threaded into the upper rear portion of the nose 12. This arrangement permits the loosening of the screw fastener 15 so that the pin 14 may be swung laterally from the plug 10, as shown in Fig. 5, to expose the pin to facilitate the impaling of a bait fish thereon.

When the bait fish is impaled on the pin 14, said pin may then be swung about the fastener 15 to its position longitudinally of the plug 10, as indicated in broken lines in Fig. 2, wherein the back of the fish will be nested against the under surface 25 and the front edge 33 of the pin 14 will abut against the rear surface 23 of the nose 12. When thus located, the screw fastener 15 may be screwed into the nose 12 so that it will abut against the pin 14 to cause to bear against the front pin edge 33 and the rear nose surface 23 to produce an upward tension on the pin 14 to hold the bait fish tightly nested within the body portion 11. As will be seen in Figs. 1 and 2, the screw fastener 15 may be in the form of an eye screw, the eye of which may support the front fish hook 17 which may, if desired, be in the form of a double hook.

The leader eye 13, as best shown in Fig. 1, may be in the form of a generally rectangular link or loop 35 that has the eye 13 formed in one of its sides whereas the side opposite the eye 13 is pivotally mounted in a bore 36 extending laterally through the nose portion 12. In actual practice the link 35 may comprise an open or split link or clevis and may be fashioned of stainless steel wire. The wire may be bent to form a rectangular portion 35 with the eye 13 looped or twisted in its front side and with the ends of the wire meeting or joined at a rear corner. One of the lateral branches or sides of the wire link 35 terminates rearwardly in a hook formation 38 and the end of the rear branch or side 37, which passes through the bore 36, is bent rearwardly to form a hook 39 overlapping the hook 38 and thereby firmly securing the link 35 together and also to the nose 12, while permitting the desired pivotal movement. It is obvious that a standard eye may be substituted for the eye link 35, and such an eye 13' is shown in Fig. 6 as being imbedded in the nose portion 12 of the plug 10.

Instead of providing the groove 27 for the reception of the shank or shaft 28 of the rear hook 16, it will be understood that said shaft may be imbedded within the body portion 11 in the event that the plug 10 is formed by molding. Furthermore, in lieu of this hook 16, an eye 40 may be secured in the rear end of the body portion 11 to which any desired type of fish hook 16' may be secured. This latter arrangement is preferred if a double hook is desired at the rear instead of the single hook 16. In order to properly anchor the eye 40 to withstand the pull thereon when a fish takes the hook 16' said eye 40 may be fashioned by looping a strand of wire to form the eye 40 and the shanks 41 of the wire may be embedded within the body portion 11, as shown in Fig. 6. Preferably, the shanks 41 have their ends 42 bent at right angles so that they may also be embedded in body portion 11 and thereby resist longitudinal pull.

In view of the foregoing description the operation and use of the device should be readily understood. When a fisherman prepares to employ the lure he selects a plug 10 of the proper size for the type of fish he hopes to catch and secures the swivel or leader L to the eye 13 or 13', depending upon which type is employed, and then pivots the pin 14 about the fastener 15 and laterally away from the plug 10. He then selects a bait fish such as a minow, smelt, sucker or other small bait fish which is of a size to properly fit the size plug 10 that is employed, and inserts the pointed end 31 of the pin 14 into the mouth of the fish F and then pushes the pin longitudinally through the fish's body. Although live bait may be employed, it is preferred to employ a dead bait fish, and the plug is so designed as to hold the dead bait fish in the position of, and to move it in, the manner of a live fish. When the bait fish F is impaled upon the pin 14, the pin is then pivoted about the fastening screw 15 until it underlies the body portion 11 whereupon the back of the fish F may be nested within the concave wall 25 of the body. In this position the front edge 33 of the pin 14 is seated against the rear surface 23 of the nose 12 and the fastener 15 may be threaded into the nose 12 to swing the pin 14 on the fulcrum at its end edge 33 toward the body 11 and to tension the pin 14 to retain the fish F nested snugly within the concave wall 25.

The lure may then be cast into the water and drawn therethrough as is the practice in casting or trolling. If the plug 10 is painted or colored to resemble the bait fish, it is highly deceptive when in the water as it is not a great deal larger than the bait fish and the entire lure appears to be but a single fish. On the other hand, if the plug 10 is in the form of a clear transparent material it becomes substantially invisible when in the water due to the similarity of visual characteristics of the transparent material and the water. This invisibility is maintained as long as there are no sharply defined corners on the plastic material, and consequently, by joining the upper and lower surfaces 22 and 25 respectively of the body 11 in the invisible edges 26 the bait fish F is clearly visible and the plug 10 is devoid of lines of demarkation that would indicate its presence.

In actual use the lure is cast into the water and then moved therethrough to simulate a swimming fish. The movement of a swimming fish is realistically reproduced by means of the planar inclined front surface 20 on the nose 12. The positioning of this surface causes this lure to wobble sideways to a minor degree as it is pulled through the water and the inclination of this surface 20 tends to cause the plug to dive whereas the pull upon the leader eye 13 is normally upwards and, consequently, there is a certain amount of up and down movement which also simulates the movement of a swimming fish. The up and down movement of the plug 10 is modified and smoothed out by the streamlining of the upper surfaces 21 and 22 of the plug 10, however, the inclination of the front surface 20 and the upper surface 21 of the nose 12 do combine to cause the plug to dive beneath the surface of the water and to travel therealong at a more or less constant level. Furthermore, as the nose 12 projects downwardly from the body 11 it forms a shield that protects the bait fish F and prevents it from being stripped or torn from the pin 14.

Although certain specific embodiments of the invention have been shown and described, it is obvious that many modifications thereof are possible. The invention, therefore, is not to be restricted, except insofar as is necessitated by the prior art and by the spirit of the appended claims.

That which is claimed, as new, is:

1. A fish lure comprising a plug including an elongated body portion having a nose portion, a leader connecting means attached to said nose portion, said body portion being of arcuate form having a channelled underside adapted to conform to and have the back of a bait fish nested thereagainst, a spring pin secured at one end thereof to said body portion and arranged to extend longitudinally beneath said body portion, said pin being adapted to have a bait fish impaled lengthwise thereon and being biased to hold said fish with its back nested in and against the channelled underside of said body portion thereby leaving the major portion of the bait-fish exposed and uncovered, and a fish hook attached to said lure.

2. A fish lure comprising a plug including an elongated body having a nose portion, a leader connecting means attached to said nose portion, said body being of arcuate form having a channelled underside adapted to conform to and have the back of a bait fish nested thereagainst, the sides of said channel narrowing to tapering edges, a pin secured at one end thereof to one end portion of said plug and arranged to extend longitudinally beneath said channelled underside of said body, said pin being adapted to have a bait fish impaled lengthwise thereon and to hold said fish with its back nested in and against the channelled underside of said body, a shank embedded in and longitudinally of said body and projecting rearwardly therefrom, and a fish hook supported by said shank.

3. A fish lure comprising a plug including an elongated body portion and a nose portion extending downwardly from the front end thereof, a leader connecting means attached to said nose portion, said body portion being in the form of an inverted trough into which the back of a bait fish may be nested, an adjustable fastener, an impaling pin extending longitudinally beneath said body portion and pivotally secured to said plug at the rear of said nose portion by said adjustable fastener and with the front end of said pin in contact against the rear surface of said nose portion for biasing or tensioning of said pin toward said body portion, whereby a fish impaled thereon may be held with its back firmly nested against the underside of said body portion, and a fish hook attached to said lure.

4. A fish lure comprising a plug including an elongated substantially arcuate body having its inner concave side grooved in the direction of its concavity to receive the back of a bait-fish nested thereagainst and forming the underside of the plug, an impaling pin arranged to extend longitudinally beneath said plug and adapted to have a bait-fish impaled lengthwise thereon, a fastener securing said pin in position, whereby said impaled fish may be held with its back nested firmly against the underside of said body portion and with its major portion exposed and uncovered, a fish hook attached to said lure, and a leader connecting means attached to the front end of said body.

5. In a bait-holding fish-lure, as described, an elongated relatively narrow body portion arc-formed lengthwise and having the concaved surface of said arc channelled to receive and have the back of a bait-fish nested thereagainst, means for releasably securing said bait-fish in said nested position on said body portion, said body member being dimensioned to extend along the back of the bait-fish with the major portion of the bait-fish exposed and uncovered, fish-hooks attached to said body portion, and a leader connecting means carried by one end of said body member.

6. In a bait-holding fish-lure, as described, an elongated relatively narrow arcuate and transparent body having a channel in its concaved surface extending from one end of said body to a point short of its other end, which latter forming a nose portion, a leader connecting means attached to said nose portion, said body being dimensioned at its channel portion to receive and substantially conform to and have the back of a fish-bait nested thereagainst with the major portion of the bait-fish exposed and uncovered, the sides of said channel narrowing to tapering edges, means for releasably securing said bait-fish in said nested position on said body, and fish-hooks attached to said body.

7. A fish lure comprising a plug including an elongated body having a nose portion, said nose portion having a leader connecting means attached thereto, the portion of said body to the rear of said nose portion having a substantially arcuate underside adapted to substantially conform to and have the back of a bait-fish nested thereagainst, a pin secured at one end thereof to said body in a manner to extend longitudinally beneath the portion of said body to the rear of said nose, said pin being adapted to have a bait-fish impaled lengthwise thereon and biased to hold said fish with its back nested against the underside of said body, thereby leaving the major portion of the bait-fish exposed and uncovered, and fish hooks attached to said body.

WARREN H. MOORE.

REFERENCES CITED

The following references are of record in the file of this patent:

UNITED STATES PATENTS

| Number | Name | Date |
|---|---|---|
| 573,572 | Dales | Dec. 22, 1896 |
| 1,324,109 | Dutes | Dec. 9, 1919 |
| 1,791,723 | Hampton | Feb. 10, 1931 |
| 2,403,759 | Sabe | July 9, 1946 |
| 2,476,126 | Weiss | July 12, 1949 |

FOREIGN PATENTS

| Number | Country | Date |
|---|---|---|
| 15,106 | Great Britain | of 1908 |
| 468,605 | Great Britain | July 8, 1937 |